Figure 1:
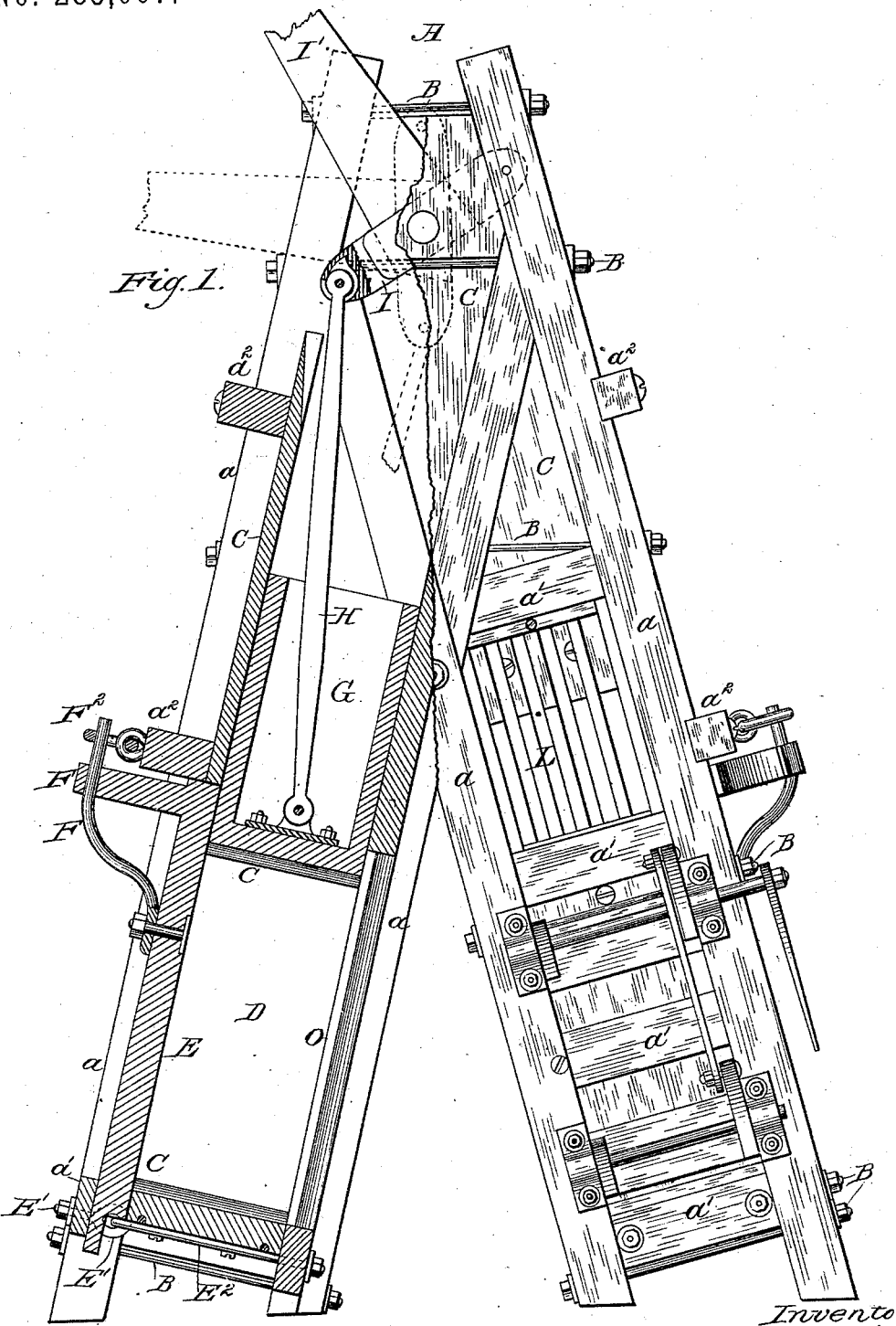

(No Model.) 2 Sheets—Sheet 2.

W. O. BUDD.
BALING PRESS.

No. 285,007. Patented Sept. 18, 1883.

Witnesses.
Will R. Cushmudts.
Theodor Lewandowski

Inventor
William O. Budd
By Jno. G. Elliott
Atty.

N. PETERS. Photo-Lithographer. Washington, D. C.

UNITED STATES PATENT OFFICE.

WILLIAM O. BUDD, OF ENGLEWOOD, ILLINOIS.

BALING-PRESS.

SPECIFICATION forming part of Letters Patent No. 285,007, dated September 18, 1883.

Application filed March 15, 1883. (No model.)

*To all whom it may concern:*

Be it known that I, WILLIAM O. BUDD, a citizen of the United States, residing in Englewood, county of Cook, and State of Illinois, have invented certain new and useful Improvements in Baling-Presses, of which the following is a specification.

This invention relates to that class of baling-presses in which the platens or plungers for compressing the bales are connected by pitmen with an actuating device at one end of the machine. In such presses the baling-chambers and feed-passages leading thereto have been arranged in parallel planes; but under such construction considerable difficulty has been experienced in locking the platen against a compressed bale so as to hold the latter while it is being tied or wired. While in some instances an effort has been made to lock the platen by bringing its pitman on the dead-center, such means have not been entirely reliable, since the pitman is apt to get off the dead-point during the operation of binding up the bale.

One of the objects of my invention is to overcome such difficulty, and to so construct and arrange the feed-passages and means for actuating the reciprocatory platens that either pitman can at the completion of its forward stroke be carried past the dead-center, whereby the pitman and platen connected therewith shall be more effectively locked against the bale than heretofore. To such end I provide a V-shaped frame having converging feed-passages for the reciprocating platens and their pitmen, and extend the frame beyond the junction of said two passages, so as to provide bearings for a rocker, with which the pitmen are connected. This arrangement allows a wide sweep to be given to the sweep-lever which is employed for actuating the pitmen, and since the latter work in converging passages, a sufficient throw of the lever to either side of the machine will cause the pitman which has been thrown forward to be carried past the dead-center.

A further object is to provide means for allowing hay or other material to be fed into the feed-opening with a fork, and pressed down by the latter in a more efficient manner than heretofore; and to such end I provide parallel slats or bars as a bottom for the feed-passage below the feed-opening, whereby the tines of a fork thrust into the hay can be passed between the said slats, and hence the fork thrust deeper into the material than if the hay rested upon a solid bottom.

A further object is to allow the door of the baling-chamber to be easily opened and the bale readily removed after it has been pressed and tied or wired; and to attain such object I provide each baling-chamber with a side door opposite an immovable side of the chamber, and an adjustable bottom, which can be allowed to drop when it is desired to increase the area of the baling-chamber, and thereby loosen the bale therein.

Heretofore a baling and pressing chamber has been provided with laterally-movable sides, so that the area of the chamber can be increased or diminished, so as to admit of the production of bales of different widths. In such instances, after the chamber has been expanded by adjusting the sides, the use of "filling-in" boards for covering the spaces between the sides and the top and bottom has been necessitated. The difference between such and my invention will, however, be apparent, since I require no filling-in boards, and simply drop the bottom, so as to loosen the bale and allow the door to be easily opened and the bale readily removed.

Figure 2:
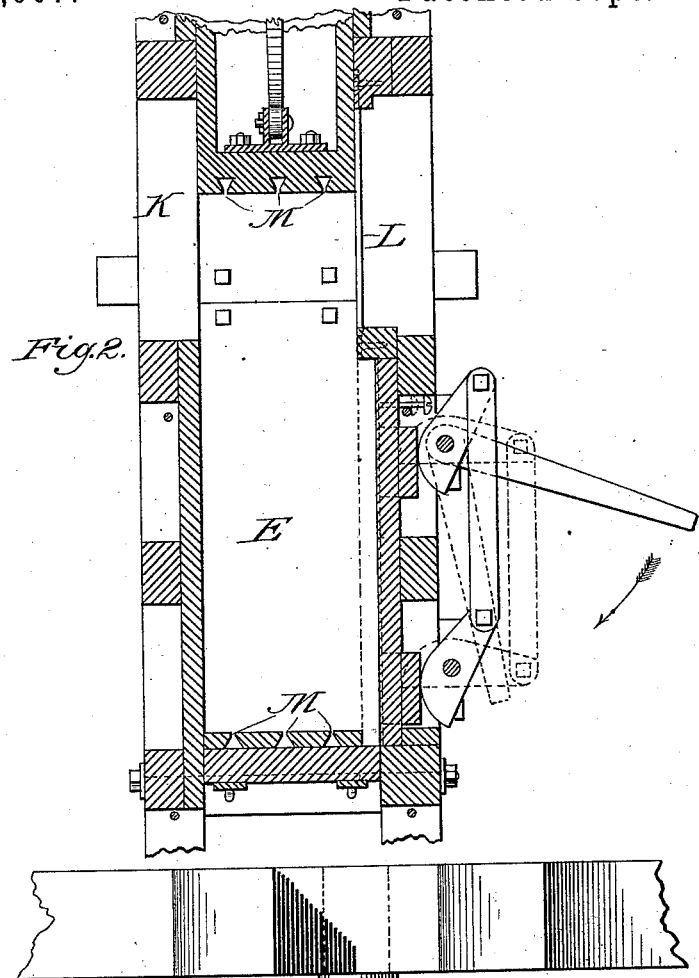
Figure 3:
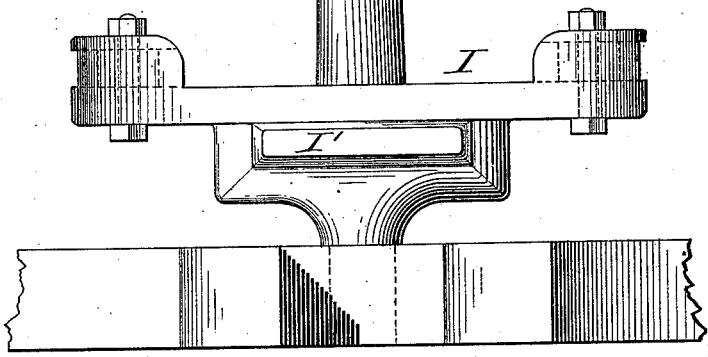

In the drawings, Figure 1 is a plan view of the under side of a V-shaped baling-press constructed in accordance with my invention, one side of the press being shown in section. It will be understood, however, that both sides of the press are in practice constructed alike. Fig. 2 is a longitudinal section taken on a vertical plane through one of the baling-chambers and platens, and shows in side elevation the means for supporting and adjusting the bottom of the baling-chamber. Fig. 3 represents in elevation the rocker for operating the pitmen.

The main frame A of the baling-press is made V-shaped, so as to provide two passages, which converge and meet at one end of the machine. Each side portion of this frame consists of a strong trunk composed of longitudinal timbers *a*, connected together at intervals by cross-bars and tie-rods disposed so as to render the structure capable of withstanding such strain as it may be subjected to during the operation of pressing the hay or other material which is to be compacted within the baling-chambers. As herein shown, the cross-bars $a'$ are arranged between the longitudinal bars $a$, and can have their ends seated in mortises joined in the latter, while the cross-bars $a^2$ can, if preferred, be extended across the longitudinal bars and mortised near their ends, so as to receive the longitudinal bars to which they are bolted. Tie-rods B, provided with tightening-nuts, are also employed for bracing and strengthening the structure, and boards C are placed at appropriate places between the longitudinal bars, for the purpose of forming permanent walls for the passages through the trunks. Other arrangements of the bars, rods, and boards can, however, be made, that shown being merely illustrative of a simple and effective mode of constructing the frame-work of the press. The longitudinal timbers of these two trunks intersect each other at one end of the main frame, and are connected by mortises and held together by the rods.

A baling-chamber, D, is provided at the outer or divergent ends of each one of the feed-passages and closed by a door, E, which can be opened to allow the bales to be taken out. The doors for the baling-chambers are hinged in any substantial manner to the main frame, and are provided with any suitable locking device for holding them closed. As a strong and effective hinge for said doors, I can provide the latter with eyebolts E', which are connected with tie rods or bars $E^2$, secured to the ends of the main frame. The fastenings for the doors can also consist, simply, of a bent rod, F, secured to the door, and a link, $F^2$, connected to the main frame and adapted to be engaged with the said bent rod.

A reciprocating platen or plunger, G, is arranged within each passage, for the purpose of compressing the hay or other material within the baling-chamber. These platens are respectively connected by pitmen H with the arms of a rocker, I, which, when vibrated, serves to reciprocate the plungers simultaneously in reverse directions. The rocker is arranged within the main frame, or between top and bottom extensions of the main frame, at a point adjacent to the junction of the convergent ends of the feed-passages through the two trunks. This point may be termed the "angle of the frame," and at such point the rocker has the journals of its axis mounted in suitable bearings either in or on the stationary frame, which at this end of the machine is open at the side, so as to allow the operating-lever to have a full sweep.

The sweep-lever I', for actuating the rocker, is fitted within a socket in the latter and extended out from the machine, so that it can be connected with any suitable motor, or be actuated by hand, steam, or horse power in any convenient way.

Feed-openings are provided for feeding hay or other material to be pressed into the passages through which the plungers travel, whereby the material fed into the press in advance of the plunger will be pushed by the latter into the baling-chamber. One of these feeding-openings K is illustrated in Fig. 2, in which the plunger is shown in the act of passing the said opening. In the bottom of the passage, below each feed-opening, is arranged a slat grate or set of parallel slats, L, upon which the hay or other material introduced through the feed-opening is received. These slats are arranged longitudinally in the passage, so that they shall be parallel with the length thereof. By providing a bottom of such construction under the feed-opening the hay fed into the passage can be pressed down by a fork in a more efficient manner than if a solid bottom were employed, since the tines of the fork can be passed down between the bars while pressing down the hay, and the latter be thereby more easily compacted and a greater quantity forced into the passage in advance of the plunger. It will also be seen that the fork can be moved forward after the tines have been inserted between the slats, whereby the material can be readily pushed forward by the fork as soon as it has been fed into the passage. The hay can also be more easily pushed forward over the bars, and the platen will slide with less friction thereon than if moved over a solid bottom.

To allow the cords or wires to be passed around the bale while the latter is held under pressure within the baling-chamber, I provide a series of parallel grooves, M, in the forward end of each platen, and in a butting-board at the end of the baling-chamber I form a like series of grooves, M', so that by passing the cords or wires through said grooves they can be carried around the ends of the bale. One of the sides of each baling-chamber is provided with a series of longitudinal slots, O, one of which is shown in Fig. 1, whereby the cords passed through the grooves opposite the ends of the bale can also be drawn through said slots and tightened directly upon one side of the bale. The passage of the cords or wires across the opposite side of the bale is readily effected by opening the door, so as to allow access to be had to the cords or wires.

The bottoms P for the baling-chambers are made adjustable, and can be lowered so as to increase the area of the baling-chamber and relieve the bale from vertical pressure, in order to allow it to be readily taken out at the side of the baling-chamber. The adjustable bottom for each baling-chamber is supported between any suitable construction of guides, and is raised flush with the bottom of the passage leading to the baling-chamber, or allowed to drop below the level of the same, by means of cam-supports Q, fixed upon the rock-shafts R, which are mounted below the adjustable bottom. These rock-shafts are connected by cranks S and a link, T, so as to have a simultaneous action, and are operated by a handlever, T', secured to one of the said shafts. The cams bear against the movable bottom, and hence by turning the handle the cams can be turned so as to allow the bottom to drop or to raise the bottom to its normal condition. It will be seen that by thus forming the baling-chamber with one rigid slotted side, a door at the opposite side, and a vertically-adjustable bottom, the door can be easily opened, and the bale can be readily removed after the bottom has been slightly lowered.

In operating this machine the hay or other material to be compressed is alternately fed into the passages after the plungers therein have been drawn back from the baling-chamber, and hence while a bale is being formed in one chamber material for a second bale can be fed into the passage leading to the second baling-chamber. At the completion of a full forward stroke of either one of the plungers the pitman thereof will be a little past the dead-center, as indicated in dotted lines, Fig. 1, whereby the plunger shall be held against the compressed bale and be locked in such position so long as its pitman remains past the dead-center. The cords or wires can be passed around the bale and tied while it is thus held by the plunger, after which the bale can be released, and the rocker vibrated so as to retract this plunger and at the same time throw the remaining plunger forward.

By constructing the frame in a V shape, as herein shown, a strong and simple structure can be obtained and access readily had to each side of the baling-chambers, whereby the cords, wires, or bands can be easily passed around the bales and tied or otherwise secured, and also the bales removed without difficulty. It will also be seen that by locating the rocker and its operating-lever at the junction of the two passages, or pointed end of the frame, the lever is rendered more accessible than in that class of double-chambered baling-presses in which the plunger-passages are parallel to each other. Moreover, the pitmen are readily brought past their dead-centers with greater ease and certainty, and a considerable saving in bulk at one end of the machine attained.

Having thus described my invention, what I claim, and desire to secure by Letters Patent, is—

1. The combination, in a baling-press, having a V-shaped frame, of a pair of passages converging at one end of the machine, and at their opposite ends terminating in baling-chambers, with the reciprocating platens connected by pitmen with the arms of a rocker which is located at the angle of the frame at the junction of the two passages, substantially as described.

2. The combination, in a baling-press, of the baling-chamber having a hinged side door, an opposite immovable side, and a vertically-adjustable bottom, with means, substantially as described, for raising or lowering the said bottom, whereby after the bottom has been lowered the side door can be easily opened and the bale readily removed, substantially as described, for the purpose specified.

3. The combination, in a baling-press, of the baling-chamber having a vertically-adjustable bottom, with the rocker-shafts provided with cams bearing against the said bottom, a crank and link connection between the shafts, and a lever for operating the same, substantially as described.

4. A baling-press constructed with a V-shaped frame having the baling-chamber and feed-passages formed in its two trunks or sides, substantially as described.

WILLIAM O. BUDD.

Witnesses:
C. A. DIBBLE,
R. BANTZ, Jr.